United States Patent [19]
Obermaier et al.

[11] 3,769,835
[45] Nov. 6, 1973

[54] PILOT CALIBRATED AIR VELOCITY MEASURING SYSTEM WITH TRANSDUCER

[75] Inventors: Alfred A. Obermaier, Barrington; Martin J. Pierman, Mount Prospect, all of Ill.

[73] Assignee: Alnor Instrument Company, Div. of Illinois Testing Laboratories, Inc., Chicago, Ill.

[22] Filed: Oct. 6, 1970

[21] Appl. No.: 78,563

Related U.S. Application Data

[62] Division of Ser. No. 687,084, Nov. 13, 1967, abandoned.

[52] U.S. Cl. .................................. 73/202, 73/204
[51] Int. Cl. ............................................. G01f 5/00
[58] Field of Search.................... 73/202, 203, 204, 73/199

[56] References Cited
UNITED STATES PATENTS

| | | | |
|---|---|---|---|
| 3,251,225 | 5/1966 | Luft | 73/204 |
| 3,374,673 | 3/1968 | Trageser | 73/204 |
| 2,207,747 | 7/1940 | Manarik et al. | 73/202 |
| 2,315,185 | 3/1943 | Boyle | 73/202 |

FOREIGN PATENTS OR APPLICATIONS

| | | | |
|---|---|---|---|
| 729,357 | 5/1955 | Great Britain | 73/203 |
| 385,314 | 12/1923 | Germany | 73/202 |
| 997,727 | 12/1923 | France | 73/203 |

*Primary Examiner*—Charles A. Ruehl
*Attorney*—I. Irving Silverman et al.

[57] ABSTRACT

An air velocity measuring system having a probe adapted to be placed into a flow of air and coupled to a measuring apparatus. The measuring apparatus may be a flow meter having a moving vane which is responsive to the air passing through the probe or it may be an electrical transducer adapted to be responsive to a flow of air through the probe. In the preferred embodiment of the invention a range adjusting switch is coupled between the probe and the measuring apparatus and enables the system to have a plurality of ranges by placing a resistance, in the form of one of a plurality of needle valves, into the path of the air flow to the measuring apparatus. The probe is a conduit having means for adjusting the quantity of air flowing to the measuring apparatus. In the preferred embodiment, the probe, the range adjusting switch, and the measuring apparatus are calibrated as a system. Once calibrated, the individual elements of the system are interchangeable with the corresponding elements of another of similarly calibrated mass produced systems without requiring subsequent recalibration of each system. The means for adjusting the quantity of air flowing to the measuring device are adjustable during the calibration of the probes individually or as part of the air velocity measuring system.

14 Claims, 13 Drawing Figures

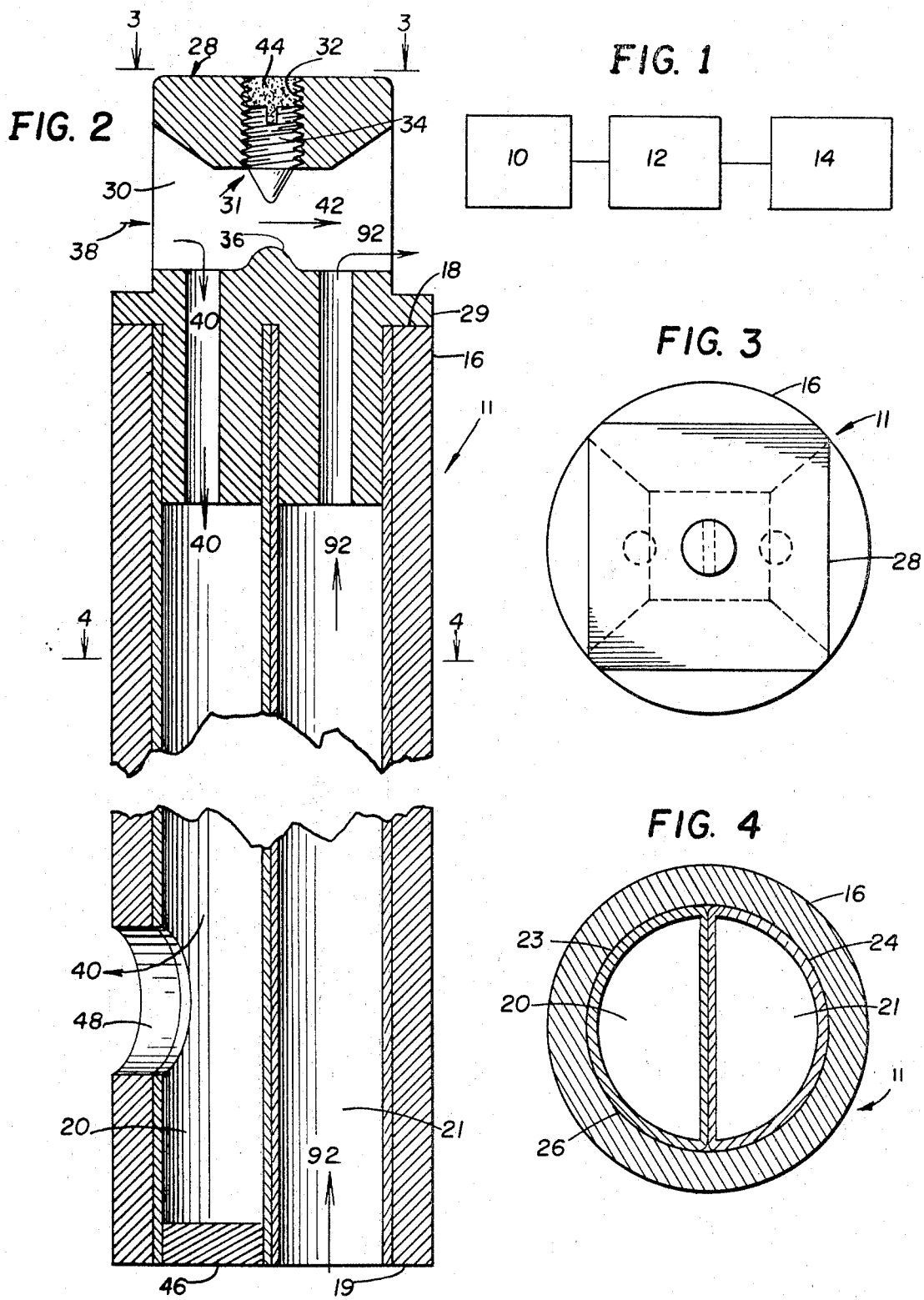

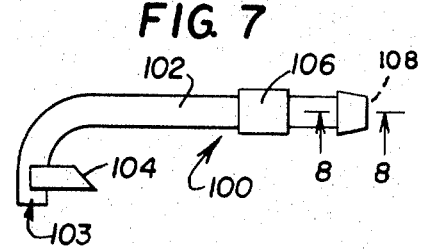
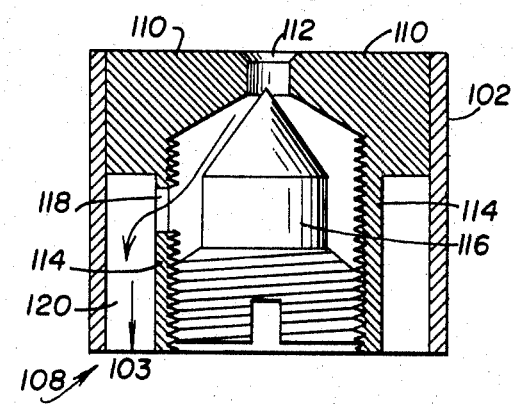
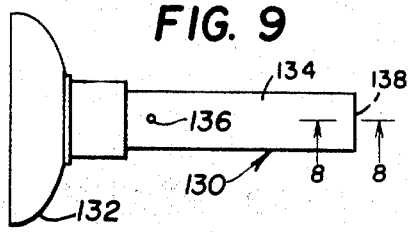
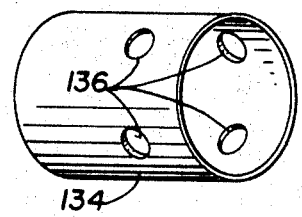
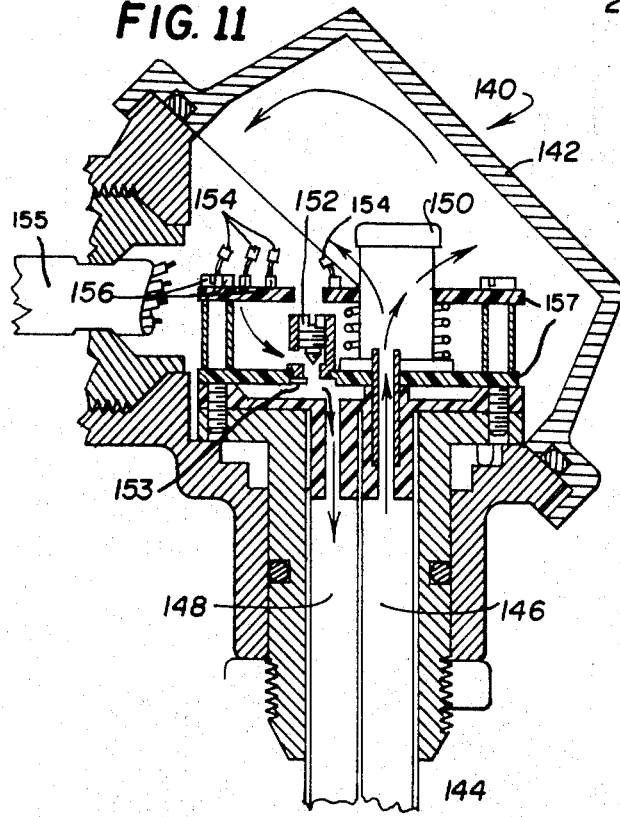
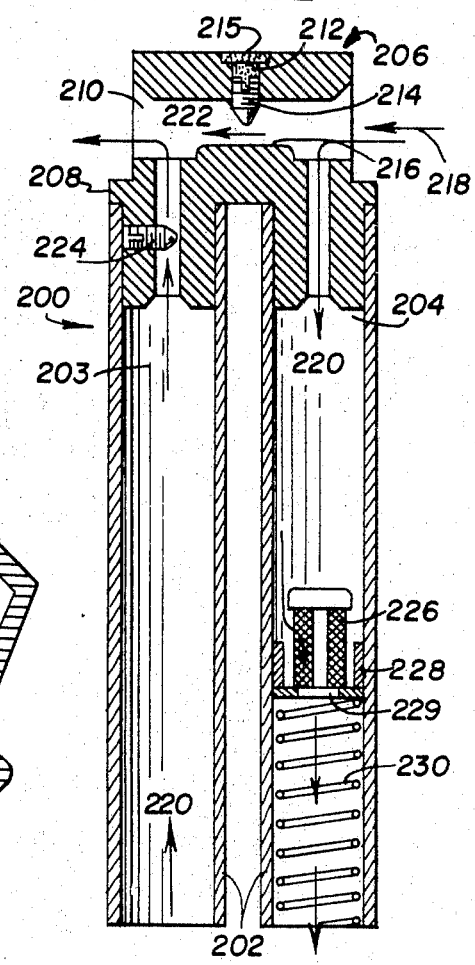

PETOT CALIBRATED AIR VELOCITY MEASURING SYSTEM WITH TRANSDUCER

This application is a division of our co-pending application Ser. No. 687,084 filed Nov. 13, 1967, now abandoned in favor of our continuation application Ser. No. 129,103 filed Mar. 29, 1971 Pat. No. 3,719,082.

BACKGROUND OF INVENTION

This invention relates generally to an air velocity measuring system and components thereof and, in particular, to an air velocity measuring system comprising a plurality of interchangeable elements possessing a common calibration yet capable of standardized, mass production such that recalibration or matching of elements in any particular system is obviated.

Air velocity measuring systems are generally well known as a tool of heating, ventilating and air conditioning engineers and servicemen. Such measuring systems generally comprise an air flow meter, which has one or more accessories attached thereto. A typical air f'ow meter is shown in U.S. Pat. No. 2,690,671 to J. A. Obermaier et al., issued Oct. 5, 1954.

Jets are a common accessory used in combination with air flow meters to obtain air velocity readings. The jets generally have an inlet and an outlet opening at each end. One end is coupled by suitable fittings to the meter; the other end is adapted to be inserted through the duct wall so that the air flow enters the inlet opening. There are a variety of jets to serve various purposes. For example, there are static pressure jets which measure the pressure at right angles to the direction of air flow in ducts, plenum chambers, or pipes. The static pressure jets generally consist of a rubber suction cup affixed to one end of a conduit, the other end of the conduit being adapted for connection to the meter. The jet is calibrated with respect to a specific air flow meter and an appropriate scale in inches of water is printed thereon.

A total pressure jet is another accessory which is commonly used in combination with the air flow meter to obtain the total pressure of the air flow within a duct or plenum. The total pressure consists of the static pressure plus the velocity pressure of the air flow. The meter and the total pressure jet are calibrated as a singular system and a scale in inches of water, is then printed on the meter corresponding to the calibrations.

A diffuser jet is another accessory which is used in combination with a meter to measure air velocity at the lips or cones of an air diffuser. The diffuser jet generally consists of a conduit having a pair of guide fins for engaging the diffuser affixed at one end. The combination of the jet and the meter are calibrated as a unit and a scale is printed on the meter corresponding to the calibrations.

There are several other types of jets, each designed to measure velocity of air flow at different points within the air stream and calibrated in combination with a specific meter. A scale is printed on the meter for each jet.

A dust filter is another accessory which can be used in combination with the meter or with the meter and a jet. The filters are primarily used where the air streams are heavily contaminated with dust. The filter must also be calibrated with the meter or meter and jet and an appropriate scale is printed on the meter.

The prior art air velocity measuring systems, as briefly described above, require each specific accessory to be calibrated with a specific meter and an appropriate scale to be printed on the meter. Each accessory or combination of accessories, once calibrated with a particular meter, cannot be used with any other meter. If an accessory is lost, damaged, or destroyed, the meter must be returned to the factory to have a new accessory calibrated with the meter. Also, if a customer requires a duplicate or a new accessory, the meter must be returned so that such accessory can be calibrated with the meter. Each accessory has a serial number which is printed on the meter with which it was calibrated.

When a meter is returned to the factory to have a lost accessory replaced, the scale representing the calibration of the lost accessory must be removed from the meter and a new scale printed thereon representing the calibration of the new accessory. The attempt to change scale designations frequently results in the obliteration of adjacent valid scale data; accordingly, it is common practice to have all of the scales redrawn when the meter is returned for a single correction. Necessarily, each time the meter is sent to the factory, the customer loses the use of the meter, which further increases his operating expenses. To obviate this lost time, some customers have found it necessary to obtain a spare meter and set of accessories for the spare meter; thus, further increasing operating overhead.

The measuring device may be a transducer which uses a thermo-element responsive to changes in temperature and provides an electrical output corresponding to the velocity of the air stream in the duct. Prior measuring systems using transducers had a thermo-element inserted directly into the air stream where it was subjected to the full pressure of the air stream as well as bombardment by particles within the duct. The thermo-element, which is very sensitive and delicate, was frequently damaged and broken, requiring replacement of the thermo-element. The prior systems using transducers were limited to low velocity measurements because the thermo-elements would break when subjected to a high velocity air stream.

SUMMARY OF THE INVENTION

The air velocity measuring system made in accordance with this invention eliminates the problems and restrictions which are characteristic of prior art systems as above described, and is characterized by a primary embodiment which includes a probe which is calibrated to match a pitot tube standard. To differentiate this probe from other probes used with the invention, we will refer to it as a "pitot probe".

The pitot probe comprises a conduit having a pair of parallel tubes and an air flow member having a passageway lying transverse to one end of the conduit and suitable for insertion into and parallel with a moving air stream. A fixed baffle and a variable baffle are positioned diametrically opposite each other within the air flow member so as to protrude into the passageway. The variable baffle is coaxial with the conduit and is adjustable, so that a predetermined, calibrated portion of the air flowing into the passageway is channeled into one of the pair of tubes. After the pitot probe has been calibrated initially so that the pressure of the air channeled into one of the pair of tubes matches the pressure reading of the pitot tube standard, it will always match the pressure ready by the pitot tube standard, for any velocity of air. Hence, the pitot probe never has to be calibrated again and the needle valve is sealed at the factory to prevent accidental change of its setting. The pitot probe may be used with any flow meter.

A range adjusting switch is interposed between the probe and the measuring device; however, the probe can be coupled directly to any suitable measuring device, including a transducer. The range adjusting switch has two separately defined passageways, positioned to mate with the two tubes of the pitot probe and a rotatable plate carrying a plurality of needle valves which place different amounts of resistance within the air flow path through the measuring device, thereby extending its range in multiples of the full scale reading.

The invention sets forth additional embodiments of a probe for use with the measuring device as well as in combination with the range adjusting switch and measuring device.

The second embodiment is a total pressure probe which comprises an L-shaped conduit having a pair of fin guides affixed to one end, for attaching to a vane or lip of a diffuser, and a needle valve at the other end. The needle valve is used to regulate the flow of air passing through the conduit to the range switch and/or the measuring device. The total pressure at the diffuser is equivalent to velocity pressure, because the static pressure is negated by the atmospheric pressure.

The third embodiment is a static pressure probe which comprises a conduit with a rubber suction cup affixed to one end and a plurality of apertures in the conduit for controllably bleeding off a portion of the air passing through the conduit. The probe is used to measure static pressure, which is measured at right angles to the direction of air flow, in ducts, plenum chambers and pipes, and is measured in inches of water. A needle valve is used to regulate the flow of air passing through the conduit to the range switch and/or measuring device.

The fourth embodiment is a low-flow pitot probe which comprises a pair of parallel tubes coupled together at one end by an air flow member and connected at their other end to the input and output of a measuring device. The air flow member has a passageway lying transverse to the tubes and is suitable for insertion into a moving air stream. A fixed and a variable baffle are positioned in the air flow member opposite each other. A range selecting valve is positioned within the air flow member to limit the air flow through the measuring device.

When the range adjusting switch is used in combination with eiter the total pressure probe or the static pressure probe, the probe engages the passageway of the switch containing the needle valve, thereby increasing the range of the meter. The range selecting switch may be coupled between the low-flow probe and the measuring device.

The pitot probe, range adjusting switch and measuring device are calibrated as a system at the factory. Once these elements are calibrated, they are interchangeable with like elements without requiring recalibration of the system. If a customer loses a probe or switch, he no longer is required to send the measuring apparatus back to the factory to have it recalibrated with a new element as well as having the scales redrawn; he simply orders the new element, places it in the system and continues to make measurements.

The transducer form of measuring device set forth in this invention can be used for continuous measurement of air velocity without the limitations of the prior systems. The transducer incorporates in one housing a thermo-element, an air filter, calibrating means, and associated circuitry. The air flow input of the housing is suitable for connection to the range adjusting switch as well as directly to the output of the pitot probe. Thus, the thermo-element is not subjected to the total pressure of the air stream or to bombardment from particles within the duct, since the pitot probe is inserted into the duct.

Accordingly, the principal object of this invention is to provide a standardized air velocity measuring system comprising precalibrated components, interchangeable with system components and their replacements in a modular manner, thereby obviating component recalibration.

It is another object of this invention to provide a probe which traces a pitot tube standard.

It is a further object of this invention to provide a range adjusting switch which greatly expands the range of an air flow measuring device independent of the full scale calibration of such a device.

It is a further object of this invention to provide an air velocity transducer for measuring the velocity of an air flow which is not limited to low velocity ranges, nor is required to have its sensing element inserted directly into the total air flow.

It is still a further object of this invention to provide systems for measuring the static and total pressures of an air flow, the elements of the systems being interchangeable with other of the same type elements without requiring the system to be returned to the factory for recalibration and reprinting of new scales on the measuring device.

It is yet a further object of this invention to provide a probe which traces a pitot tube standard and has range adjusting means positioned therein.

Many other objects will occur to those skilled in this art, as a detailed description of a preferred embodiment of the invention is set forth in connection with the accompanying drawings.

BRIEF DESCRIPTION OF THE DRAWINGS

FIG. 1 is a block diagram of an air velocity measuring system according to this invention and consists of a probe, a range adjusting switch and a measuring apparatus;

FIG. 2 is a longitudinal section through one embodiment of a probe constructed in accordance with the invention;

FIG. 3 is a top plan view taken along the line 3—3 of the probe structure illustrated in FIG. 2;

FIG. 4 is a cross-sectional view taken along the line 4—4 of the probe structure illustrated in FIG. 2;

FIG. 7 is a side elevational view of a second embodiment of a probe constructed in accordance with the invention;

FIG. 8 is a sectional view of the probe structure illustrated in FIG. 7 and along line 8—8 of that figure.

FIG. 9 is a side elevational view of a third embodiment of a probe constructed in accordance with the invention;

FIG. 10 is a fragmentary perspective view of the probe structure illustrated in FIG. 9 showing the apertures in the probe;

FIG. 11 is a longitudinal section through the air velocity transducer constructed in accordance with the invention; and FIG. 12 is a longitudinal section through a fourth embodiment of a probe constructed in accordance with the invention.

DESCRIPTION OF THE PREFERRED EMBODIMENT

Figure 5:
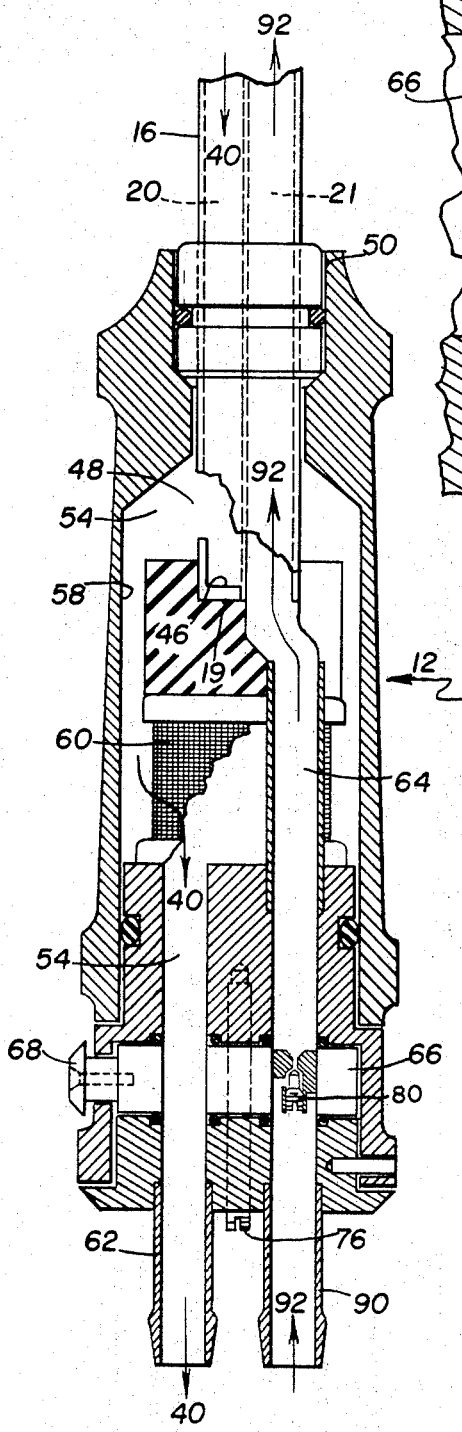
FIG. 5 is a longitudinal section through the range adjusting switch constructed in accordance with the invention.

Referring now to the drawings, FIG. 1 is a block diagram of the air velocity measuring system consisting of a probe 10, a range adjusting switch 12 and a measuring device 14 suitable for measuring the velocity of air and having an input and output, integral therewith.

One embodiment 11, of the probe 10, is illustrated in FIGS. 2, 3 and 4 and comprises a conduit 16, having two ends 18 and 19. A pair of tubes 20 and 21 of D-shape cross section are longitudinally positioned within the conduit 16 such that their respective arcuate surfaces 23 and 24 abut the interior wall 26 of the conduit 16. It will be appreciated that the conduit and tubes could also be defined by a unitary structure and that the tubes may have other than the preferred D-shape cross section.

An air flow control member 28 is telescoped into the conduit end 18 and seats thereagainst via an annular flange 29. The air flow member 28 and its counterpart 108 in FIG. 7, 136 in FIG. 9, and 206 in FIG. 12 are adjustable prior to calibrating the probes individually or as part of an air velocity system. A transverse passageway 30 extends through the control member 28. A variable baffle 31, which comprises a threaded bore 32 and a needle screw 34, is positioned in the member 28 coaxial with the conduit 16. The variable baffle 31 extends partially into the passageway 30. A fixed baffle 36 is positioned opposite the pointed end of the needle screw 34 so that an air stream as represented by the arrow 38 entering the passageway 30 is partially channeled into the tube 20 as represented in FIG. 2 by the arrow 40. The remaining part of the air stream, represented by an arrow 42 passes through the passageway 30.

The fixed baffle 36 and the variable baffle 31 are used in combination to calibrate the probe 10 to a pitot tube standard as described hereinafter. The air stream 38 entering the passageway 30 has a total pressure which consists of a velocity pressure and a static pressure. The velocity pressure component 40 is, diverted into the tube 20 primarily by the baffle 36; whereas, the variable baffle 31 is employed for fine adjustment of the air flow 40 into tube 20 so that the velocity pressure of the channeled air stream 40 matches the pressure indicated by the pitot tube standard.

In order to calibrate the probe 11, it and the pitot standard and independently connected to the same duct to monitor the velocity pressure of an air stream having a substantially constant velocity. The pitot tube measures the differential pressure, which is equivalent to the velocity pressure of the air stream. After the pitot probe has been matched by the adjustment of the variable baffle 31 so that the pressure of the air channeled into tube 20, matches the pressure reading of the pitot tube standard, it will always match the pressure read by the pitot tube standard regardless of the velocity of the air stream. An epoxy seal 44 is applied to the screw 34 after the probe 11 has been calibrated to fix its setting. The lower end of the tube 20 contains a plug 46 and a transverse aperture 48 which act to direct the air velocity pressure component outward from the probe to range adjusting switch 12, which is illustrated in FIG. 5, or directly to the measuring apparatus 14.

With reference to FIG. 5, the switch 12 has a receptacle 50 for receiving the end 19 of the conduit 16. A chamber 54 is defined within the switch 12 and communicates with the tube 20 via its aperture 48 so that the channeled air stream component 40 passes into the chamber 54. The conduit end 19 abuts a rubber bushing 56, which in combination with an inner wall 58 of the switch 12, defines a continuation of the chamber 54 for the velocity component 40. A filter 60 is also positioned within switch 12 and is interposed within the chamber 54 so that channeled air stream component 40 passes therethrough. An air intake extension 62 forms the terminus of the chamber 54. A longitudinal return path chamber 64 extends the length of switch 12, is isolated from the chamber 54, and bypasses the filter 60.

A rotatable range switch plate 66 is mounted adjacent to the lower end of switch 12 and is rotatable therein by a spring biased knob 68. The range switch plate, which is shown in detail in FIG. 6A, has a plurality of peripheral apertures 70, 71, 72 and 73 which cooperate in pairs. Apertures 70 and 71 alternately communicate with the input passageway 54; whereas, the apertures 72 and 73 alternately communicate with the return path chamber 64. A central aperture 74 coacts with a compression screw 76 for securing and positioning the switch plate 66. It is to be understood that the aperture 70 and 71 could also alternately communicate with the return passageway 64 while the apertures 72 and 73 alternately communicate with the passageway 54.

Figure 6:
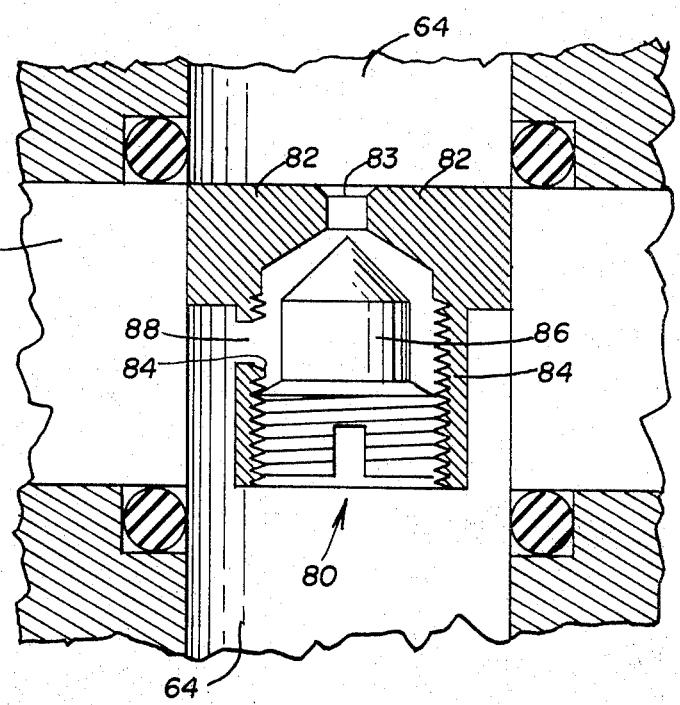
FIG. 6 is a partial cross section of the needle calibrating valve of the structure illustrated in FIG. 5.
Figure 6A:
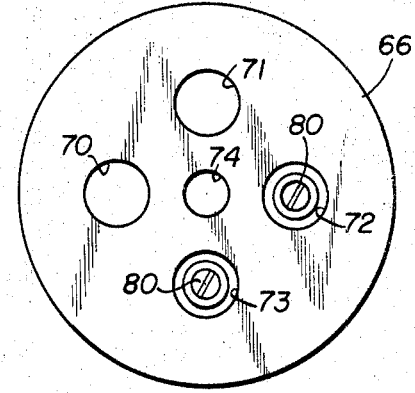
FIG. 6A is a plan view of the rotating switch plate illustrated in FIG. 5.

A needle valve 80, which is illustrated in detail in FIG. 6, is housed in each of the apertures 72 and 73. Each valve 80 contains a seat 82, which defines a first opening 83, and threaded portion 84, which extends outwardly therefrom for receiving a needle member 86. A second opening 88 in the threaded portion 84 communicates with the return path chamber 64.

An air return extension 90 forms the entrance to the chamber 64 and communicates with the output of the measuring device 14. The channeled air stream 40, which enters the measuring device 14 via the channel 54, returns through the switch 12 via the channel 64 and the probe 11 via the tube 21 and is designated by an arrow 92. Each of the needle valves 80 places a different precalibrated resistance into the path of the channeled air stream and thereby increases the range of the measuring apparatus 14 by specifically defined increments.

The return path 64 through the switch 12 and the tube 21 of the conduit 16 return the air velocity component 40 from the measuring device 14 to the air flow control member 28, where the component 40 combines with the static pressure air flow 42 and exits from the passageway 30.

In order to calibrate the pitot probe to match a pitot tube standard, the air velocity component 40 must be returned to its initial environment, so that a complete unitary system is maintained.

The pitot probe can be coupled directly to the measuring device 14. The probe and the measuring device must then be calibrated to the pitot tube standard without the switch. In other words, the system which is to be used by the customer, be it the probe, switch and measuring device or the probe and measuring device, is the system which must be matched to the pitot tube standard.

FIG. 7 illustrates a second embodiment 100 of the probe 10 which is especially adapted for measuring total pressure from a diffuser usable in combination with the switch 12 and the measuring apparatus 14, as well as with the measuring apparatus 14 alone.

The probe 100 comprises an L-shaped conduit 102, suitable for passing an air flow designated by arrow 103 from one end to the other end, a pair of fin guides 104, an annular collar 106, and a valve 108. The valve 108, which is detailed in FIG. 8, provides means for variably controlling the amount of air flow to the measuring device 14 and comprises a seat 110, which defines a first aperture 112 coaxial with the conduit 102, a threaded portion 114 extending outwardly from the conduit 102, and a needle member 116 in coacting relationship therewith. A second aperture 118 in the threaded portion 114 communicates with a channel 120, which is defined by the interior wall of the conduit 102 and the threaded portion 114, so that the air flow 103 passes through the apertures 112 and 118 through the channel 120 and then either directly to the input of the measuring device 14 or to chamber 54 or 64 of the range switch 12 and then to the input of measuring device 14.

A third embodiment 130 of the probe 10, illustrated in FIG. 9, may be coupled directly to the input of the measuring device 14 or to either chamber 54 or 64 of the range switch 12, which in turn is coupled to the input of measuring device 12.

The probe 130, which is designed for measuring static pressure, comprises a rubber suction cup 132 affixed to one end of a multi-apertured conduit 134. A plurality of air flow control apertures 136, illustrated in FIG. 10, are provided to control a portion of the air flowing through conduit 134. A needle valve 138, similar to the one described in FIGS. 6 and 8 is positioned at the other end of the conduit 134 for controlling the air flow 59 the input of the measuring device 14 or to chamber 54 or 64 of the range switch 12 and then to the input of the measuring device 14.

A small hole is drilled into the duct in which the static pressure is desired to be measured. The suction cup 132 of the probe 130 is positioned over the hole. The air flow passing from the duct to the conduit is controlled by the apertures 136 and the valve 138 so that the range of the measuring device 14 is extended beyond its designated range, even without the switch 12.

FIG. 11 illustrates an improved transducer form of measuring device 140 which comprises a housing 142 having a tubular extension 144 defining respectively a pair of input and output passageways 146, 148. A filter 150 is positioned adjacent the interior of the input passageway 146 within the body of the housing 142. A needle valve 152, similar to the type described in FIGS. 6 and 8 is positioned at the interior end of the output passageway 148 for controlling the air flow through the housing 142.

An element 153 responsive to changes in temperature is interposed between the valve 152 and the output passageway 148. One type of element responsive to changes in temperature employs a thermocouple coupled to a heating wire. The magnitude of the air flow passing over the heated thermocouple varies the output of the thermocouple accordingly.

A plurality of wires 154 are connected to a like plurality of terminals 156 for supplying power to the element and for transmitting signals from the element to a recording device, not shown. In this manner, the temperature changes in the element caused by changes in the magnitude of air flow passing over it are monitored in a mode which, as known in the art, enables the measuring of the air flow velocity.

A fourth embodiment 200 of the probe 10 is illustrated in FIG. 12 and comprises a conduit 202 having a pair of parallel tubes 203 and 204. An air flow control member 206, similar to the type described in FIG. 2, is telescoped into one end of the pair of tubes and seats thereagainst via an annular flange 208. A transverse passageway 210 extends through the control member 206. A threaded bore 212 and a mating needle screw 214, extend partially into the passageway coaxial with the member 206, and act as a variable baffle within the air flow member. A fixed baffle 216 is positioned opposite the pointed end of the needle screw 214 so that an air stream, as represented by the arrow 218, entering the passageway 210 is partially channeled into the tube 204 as represented by an arrow 220. The remaining part of the air stream, represented by an arrow 222, passes through the passageway 210. The baffle 216 and the needle screw 214 are used in combination to calibrate the probe 200 to a pitot standard as described above for the first embodiment illustrated in FIGS. 2, 3, and 4. An epoxy seal 215 is applied to the screw 214 after the probe has been calibrated to fix its setting.

A range selecting needle valve 224 is housed within the air flow member 206 to restrict the air flow passing through the measuring device 14. The needle valve 224 is preset at the factory to calibrate the probe 200 to a specific one of a plurality of standard ranges and cannot thereafter be recalibrated or adjusted by the user.

A filter 226 is positioned within and coaxial with the tube 204 and an annular ring 228. The annular ring is secured to the interior wall of the tube 204. The filter 226 has a base 229 which abuts the ring 228 and is retained thereagainst by a retaining spring 230. The filter 226 is easily removed for cleaning or replacing by releasing the retaining spring 230.

The end of tubes 203 and 204, opposite the air flow member 206, are connected respectively to the output and input of the measuring device 14. The air flow 220 passes through the filter 226 into the input of the measuring device 14 and returns to the passageway 210 by means of tube 203 and the range selecting valve 224.

The range selecting switch 12 may be coupled between the low-flow probe 200 and the measuring device 14. The range selecting switch 12, when coupled between the measuring device 14 and the probe 200 will extend the range of the measuring device 14 in specific increments. The filter 60 can be removed from the switch 12 when the switch is used with the probe 200.

It is believed that the invention has been described in such detail as to enable those skilled in the art to understood the same, and it will be appreciated that variations or modifications may be made without departing from the spirit or scope of the invention.

What is desired to secure by letters patent in the United States is:

1. The combination of an air velocity measuring transducer and an air velocity probe, said transducer comprising: a housing having an input, an output and a tubular extension; said tubular extension defining a pair of passageways which communicate, respectively, with said input and said output, separately; a thermo-element positioned between said input and said output within said housing so that air flow passing through one of said passageways influences said thermo-element to generate thermo-responsive changes; and electrical coupling means coupled to said thermo-element for enabling energization thereof and also coupled for transmitting from said housing said thermo-responsive changes; said air velocity probe comprising: a conduit one end of which is constructed to be connected to said tubular extension and the other end of which is constructed for being positioned transverse to an air stream, the velocity of which is to be measured; said conduit defining a pair of tubes for connection, respectively, to said pair of passageways; connection of said probe to said transducer defining a continuous air flow path into and through one of said tubes, through one of said passageways, through said housing, through the other of said passageways, and through and then outward from the other of said tubes; and means for controlling the amount of air flow passing through said transducer, said controlling means comprising a needle valve which defines a channel communicating with said thermo-element and one of said passageways.

2. The combination as define in claim 1 wherein said tubes each has a D-shaped cross section and said tubes are positioned within said conduit so tha the arcuate surface of said D-shaped tubes abuts the interior surface of said conduit.

3. The combination of an air velocity measuring transducer and an air velocity probe, said transducer comprising: a housing having an input, an output and a tubular extension; said tubular extension defining a pair of passageways which communicate, respectively, with said input and said output, separately: a thermo-element positioned between said input and said output within said housing so that air flow passing through one of said passageways influences said thermo-element to generate thermo-responsive changes; and electrical coupling means coupled to said thermo-element for enabling energization thereof and also coupled for transmitting from said housing said thermo-responsive changes; said air velocity probe comprising: a conduit one end of which is constructed to be connected to said tubular extension and the other end of which is constructed for being positioned transverse to an air stream, the velocity of which is to be measured; said conduit defining a pair of tubes for connection, respectively, to said pair of passageways; connection of said probe to said transducer defining a continuous air flow path into and through one of said tubes, through one of said passageways, through said housing, through the other of said passageways, and through and then outward from the other of said tubes; said probe further comprising an air flow control member affixed to the other end of said conduit, a passageway through said member transverse to said pair of conduit tubes, and a variable baffle disposed within said air flow member and transverse to said passageway.

4. The combination as defined in claim 3 wherein said air flow control member further includes: a fixed baffle disposed within and transverse to said passageway opposite said variable baffle, said variable baffle and said fixed baffle being disposed so that part of the air flow passing into said passageway is diverted into said one tube communicating with the input to said measuring device.

5. The combination as defined in claim 3 wherein said variable baffle comprises: a threaded bore coaxial with said conduit and communicating with said passageway through said member, and a threaded needle valve coacting with said threaded bore and partially extending into said passageway.

6. An air velocity measuring system comprising: a conduit adapted to be placed into a flow of air, the velocity of which is to be measured, said conduit having precalibrated air flow control means positioned therein, an air velocity measuring device having an air flow input and output, and a measuring device range adjusting switch coupled between said conduit and said measuring device and defining an air path thereto, said switch having selectible air resistance means for placement into said air path; said air velocity measuring device being a transducer comprising: a housing having a tubular extension constructed therebetween, a first and a second passageway defined within said tubular extension, said passageways separately communicating with said input and output, respectively, of said air velocity measuring device, means for controlling the amount of air flow passing through said transducer, and a thermo-element disposed between said input and said output, for sensing changes of air velocity of the air flow passing thereover and transducing such changes into a calibrated output.

7. An air velocity measuring system as defined in claim 6 wherein said means for controlling the amount of air flow through said transducer comprises: a needle valve which defines a channel communicating with said thermo-element and said second passageway.

8. An air velocity measuring system as defined in claim 6 wherein said air flow control means comprises: an air flow control member affixed to one end of said conduit and having a passageway transverse to said conduit, and a variable baffle disposed within said air flow control member and transverse to said control member passageway.

9. An air velocity measuring system as defined in claim 8 wherein said air flow control member further comprises: a fixed baffle disposed within and transverse to said control member passageway opposite siad baffle.

10. An air velocity measuring system as defined in claim 9 wherein said variable baffle comprises: a threaded bore coaxial with said conduit and communicating with said control member passageway through said member, and a threaded valve coacting with said threaded bore and capable of partially extending into said control member passageway, whereby said air flow control member channels a portion of the air flow passing into said control member passageway into said conduit.

11. An air velocity measuring system as defined in claim 6 wherein said conduit includes a pair of adjacent tubes for communication to and from said range adjusting switch, and said range adjusting switch comprises: a pair of longitudinally positioned chambers, a receptacle at one end of said pair of chambers, said receptacle being adapted for connecting said tubes to said chambers, said selectible air resistance means consists of a plurality of restrictve members, and means for placing a selected one of said plurality of restrictive members into one of said chambers to restrict the air flow through said measuring device, said chambers being coupled to the input and output of said measuring device.

12. An air velocity measuring system as defined in claim 11 wherein said first and second passageways of said transducer housing are adapted to communicate with said pair of chambers, a filter is positioned adjacent said input so that an air flow passing through said first passageway enters said filter, said thermo-element is disposed between said filter and said output, and electrical coupling means are provided for enabling energization of said thermo-element and for transmitting the calibrated output thereof from said housing.

13. An air velocity measuring system as defined in claim 11 wherein said conduit has a first and a second end and includes a pair of adjacent tubes, one end of one of said conduit tubes is closed to inhibit the flow of air therethrough, said conduit and said one tube is apertured proximate said first end of said conduit so as to define means whereby air flow passes from said one tube to the input of said measuring device, both said tubes are adapted to be coupled to said range adjusting switch proximate the first end of said conduit, and said air flow control means is affixed to the second end of said conduit.

14. An air velocity measuring system as defined in claim 13 wherein each of said tubes has a D-shaped cross section and is positioned within said conduit so that the interior surface of said conduit is abutted by the arcuate surface of said D-shaped tubes.

* * * * *

PO-1050
(5/69)

UNITED STATES PATENT OFFICE
CERTIFICATE OF CORRECTION

Patent No. 3,769,835          Dated  Nov. 6, 1973

Inventor(s) ALFRED A. OBERMAIER, et al.

It is certified that error appears in the above-identified patent and that said Letters Patent are hereby corrected as shown below:

Title Page, line 1, change "PILOT" to --PITOT--. Column 1, line 1, change "PETOT" to --PITOT--; line 20, change "f'ow" to --flow--. Column 2, line 65, change "ready" to --read--. Column 9, line 37, change "tha" to --that--. Column 10, line 28, after "constructed" insert --for connection to said conduit for air flow communication--.

Signed and sealed this 9th day of April 1974.

(SEAL)
Attest:

EDWARD M. FLETCHER, JR.
Attesting Officer

C. MARSHALL DANN
Commissioner of Patents